(12) United States Patent
Zi et al.

(10) Patent No.: US 11,325,243 B2
(45) Date of Patent: May 10, 2022

(54) FLEXIBLE-ROPE-DRIVEN HYBRID SPRAY PAINTING ROBOT MECHANISM AND OPERATING METHOD THEREOF

(71) Applicant: HEFEI UNIVERSITY OF TECHNOLOGY, Hefei (CN)

(72) Inventors: Bin Zi, Hefei (CN); Xu Wang, Hefei (CN); Zhengyu Wang, Hefei (CN); Daoming Wang, Hefei (CN); Sen Qian, Hefei (CN); Wei You, Wuhu (CN); Lei Zheng, Wuhu (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 17/594,388

(22) PCT Filed: May 27, 2020

(86) PCT No.: PCT/CN2020/092545
§ 371 (c)(1),
(2) Date: Oct. 14, 2021

(87) PCT Pub. No.: WO2021/196381
PCT Pub. Date: Oct. 7, 2021

(65) Prior Publication Data
US 2022/0088792 A1 Mar. 24, 2022

(30) Foreign Application Priority Data
Mar. 31, 2020 (CN) .......................... 202010243575.1

(51) Int. Cl.
*B25J 9/00* (2006.01)
*B25J 11/00* (2006.01)

(52) U.S. Cl.
CPC .......... *B25J 9/0078* (2013.01); *B25J 11/0075* (2013.01); *B25J 9/0072* (2013.01)

(58) Field of Classification Search
CPC ........ B25J 9/0072; B25J 9/0078; B25J 9/104; B25J 11/0075; G05B 2219/39457;
(Continued)

(56) References Cited

U.S. PATENT DOCUMENTS

| 2009/0066100 A1* | 3/2009 | Bosscher | E04G 21/0418 901/30 |
| 2014/0331808 A1* | 11/2014 | Reid | B25J 9/0075 74/490.04 |
| 2021/0276177 A1* | 9/2021 | McRoberts | B29C 64/236 |

FOREIGN PATENT DOCUMENTS

| CN | 106861981 A | 6/2017 |
| CN | 106078800 B | 3/2018 |

(Continued)

OTHER PUBLICATIONS

International Search Report issued in corresponding International Application No. PCT/CN2020/092545; dated Dec. 28, 2020, China National Intellectual Administration, Beijing, China, 8 pgs.
(Continued)

*Primary Examiner* — Dale Moyer
(74) *Attorney, Agent, or Firm* — Hauptman Ham, LLP

(57) ABSTRACT

A flexible-rope-driven hybrid spray painting robot mechanism includes a static platform framework, a flexible-rope-guided pulley train, flexible transmission ropes, a moving platform, and drive mechanisms. A moving platform casing is driven by eight flexible ropes in parallel, to realize three degrees of freedom of translation thereof. A spray gun is connected in series to the moving platform casing via a universal joint cross, and is driven by four flexible ropes in parallel, to realize two degrees of freedom of rotation thereof. Beneficial technical effect of the present invention: The flexible ropes are used in parallel to control three degrees of freedom of translation and two degrees of freedom of rotation of the end spray gun, achieving advantages
(Continued)

of a small movement inertia and flexible movement. Electric drive devices are placed together in a bottom layer of the static platform framework and are isolated from a spraying space.

10 Claims, 7 Drawing Sheets

(58) Field of Classification Search
CPC .......... G05B 2219/40273; G05B 2219/45065; G05B 2219/45013; G05B 2219/45238; G05B 2219/49253
See application file for complete search history.

(56) References Cited

FOREIGN PATENT DOCUMENTS

| | | |
|---|---|---|
| CN | 108000871 A | 5/2018 |
| CN | 109395938 A | 3/2019 |
| CN | 209078735 U | 7/2019 |
| CN | 110605703 A | 12/2019 |
| CN | 110900591 A | 3/2020 |
| KR | 1020190005556 A | 1/2019 |
| WO | 2015170361 A1 | 11/2015 |

OTHER PUBLICATIONS

Written Opinion issued in corresponding International Application No. PCT/CN2020/092545; dated Dec. 28, 2020; China National Intellectual Administration, Beijing, China, 8 pgs.

\* cited by examiner

FLEXIBLE-ROPE-DRIVEN HYBRID SPRAY PAINTING ROBOT MECHANISM AND OPERATING METHOD THEREOF

RELATED APPLICATIONS

The present application is a U.S. National Phase of International Application Number PCT/CN2020/092545 filed May 27, 2020 and claims priority to Chinese Application Number 202010243575.1 filed Mar. 31, 2020.

TECHNICAL FIELD

The present invention relates to the field of robots, and in particular, to a flexible-rope-driven hybrid spray painting robot mechanism and an operating method thereof.

BACKGROUND

Surface spraying is a very important link in manufacturing. Almost all electromechanical products, electronic products, furniture, etc. in modern life involve surface spraying treatment in respective manufacturing processes. Conventional surface spraying technology is mainly based on a manual manner. During a spraying process on the surface of a product, a large amount of harmful substances such as amines, aldehydes, benzene, etc. volatilized from paints and coatings seriously pollute the working environment and have a greatly negative impact on workers' physical health and emotion at work, thus affecting the spraying quality and efficiency and the paint utilization. The successive emergence of spray painting robots liberates workers from the harmful working environment, and further significantly increases production efficiency and reduces production costs.

The current spray painting robots are mostly serial robots, and the research on a serial robotic arm is relatively mature. The serial robotic arm has such advantages as a simple structure, low cost, easy control, and an open space for movement. However, for a common serial robotic arm, its series structure of rigid mechanical cantilevers makes the whole rigidity relatively poor, causing shortcomings such as a cumulative error and a large movement inertia. The serial robot can meet the demands in the field of painting with general requirements. However, in the field of fine spraying, it is required to reduce the cumulative error at the end of the serial robotic arm from hardware and software aspects such as a reducer, precision transmission, closed-loop control, etc., so as to improve its precision. The serial robot has a relatively open working space, but the size of its working space is limited by the length of the arm span of the robotic arm. When the conventional serial robotic arm conducts spraying in a relatively large space, if the arm length of the robotic arm is increased, the whole rigidity is not only reduced, but also the cumulative error in position and posture at the end and the weight of the robotic arm are increased and further a strong drive is required, thus increasing the costs. However, a flexible-rope-driven parallel robot mechanism uses parallel flexible ropes together to directly control an end effector, and a drive device may be placed on a static platform, so that the weight of a moving part is reduced, thus achieving the advantages of no cumulative error, a good dynamic response, high rigidity, easy reconstruction, and a large working space.

In a flexible-rope-driven parallel mechanism, because connections between the ropes and the moving and static platforms are not restricted by hinge corners and the flexible rope has the characteristics of easy extension and retraction, a working space of the parallel mechanism is significantly enlarged. In a design of a spray painting robot mechanism driven by flexible ropes in parallel in the patent No. CN109395938A, eight flexible ropes are used in parallel to drive the movement of an end effector, where eight motors are required to drive the eight flexible ropes, and eight motors are further required to drive eight ball lead screw pairs for adjusting positions of pulleys bearing the flexible ropes. Because a longer ball lead screw indicates poorer rigidity thereof, the working space of such a mechanism is rather limited. In a seven-degrees-of-freedom cable-rod-driven hybrid robotic arm and a transport method thereof in the patent No. CN106078800B, the main body, namely, the robotic arm, has a series structure; and the joint parts are driven by flexible ropes in series and in parallel. However, shortcomings of a small load capacity, poor dynamic characteristics, and poor stability still exist.

At present, the control over the compound movement of translation plus rotation of the end effector by the flexible-rope-driven parallel mechanism highly depends on the number of flexible ropes, a position of the connection between each flexible rope and the moving platform, and a position of the connection between each flexible rope and the static platform. In the hybrid flexible-rope-driven mechanism that is designed by the present invention, a moving platform casing is connected in series to an end carrier, and they are separately driven by parallel flexible ropes to control three degrees of freedom of translation of the moving platform casing and two degrees of freedom of rotation of the end with respect to the moving platform casing. Thus, the end spray gun is more flexible and can achieve a variety of complex movement postures, and further, an excessive mass of the end series part is avoided, and such advantages as good dynamic characteristics, a simple structure, a large bearing ratio, and a large working space are achieved.

SUMMARY

The objective of the present invention is to overcome the shortcomings in the prior art, and to provide a flexible-rope-driven hybrid spray painting robot mechanism and an operating method thereof.

The present invention is achieved by using the following technical solutions:

A flexible-rope-driven hybrid spray painting robot mechanism includes:

a static platform framework having upper and lower two three-dimensional spaces;

a workpiece conveying mechanism, mounted at the bottom of the upper three-dimensional space of the static platform framework;

drive mechanisms mounted at the bottom of the lower three-dimensional space of the static platform framework;

a moving platform moving in the upper three-dimensional space of the static platform framework, where a spray gun is mounted on the moving platform;

flexible transmission ropes connected to the moving platform at the ends and connected to the drive mechanisms at the other ends; and a flexible-rope-guided pulley train attached and mounted onto the whole static platform framework and used to realize guiding of the flexible transmission ropes;

where the drive mechanisms drive the flexible transmission ropes to control three degrees of freedom of translation of the moving platform and two degrees of freedom of rotation of the spray gun with respect to the moving platform, thus realizing spraying of a workpiece on the workpiece conveying mechanism.

The static platform framework is formed by an upper rectangular frame, a lower rectangular frame, a framework base, vertical frame edges, lateral barrier plates, and a bottom barrier plate, where the four vertical frame edges connect the upper rectangular frame, the lower rectangular frame, and the framework base, to form upper and lower two three-dimensional spaces; the upper three-dimensional space is a movement space for the moving platform, and the lower three-dimensional space is used to accommodate the drive mechanisms; the lateral barrier plates are respectively mounted at the four lateral sides of the lower three-dimensional space, and the bottom barrier plate is mounted on the lower rectangular frame; four flexible-rope-guided pulley trains in total are distributed circumferentially on the static platform framework, and are used to guide the flexible transmission ropes; and the workpiece conveying mechanism passes through the upper three-dimensional space from below and is connected to the lower rectangular frame, so as to realize automatic fixing of the workpiece.

The flexible-rope-guided pulley train includes a first upward-traction guide pulley, a second upward-traction guide pulley, a third upward-traction guide pulley, a fourth upward-traction guide pulley, a fifth upward-traction guide pulley, a sixth upward-traction guide pulley, a double guide pulley, a first downward-traction guide pulley, a second downward-traction guide pulley, a third downward-traction guide pulley, a first rotation-traction guide pulley, a second rotation-traction guide pulley, and a third rotation-traction guide pulley.

The first upward-traction guide pulley is mounted on a corner of the upper rectangular frame, and the geometric circle center of the first upward-traction guide pulley falls on the axis of a vertical frame edge where it is located, so that the first upward-traction guide pulley is able to freely slide on a 90-degree arc-shaped slide rail; the second upward-traction guide pulley is mounted on a beam of the upper rectangular frame that is on a clockwise direction in which the first upward-traction guide pulley turns around the axis of its corresponding vertical frame edge, and the circle of a slide path of the second upward-traction guide pulley is always tangent to the middle section of a slide path of the first upward-traction guide pulley; the third upward-traction guide pulley is mounted on a vertical frame edge at the right side of the second upward-traction guide pulley, a symmetry plane of the third upward-traction guide pulley is kept passing through the central axis of the vertical frame edge, and the circle of a slide path of the third upward-traction guide pulley is tangent to the middle section of the slide path of the second upward-traction guide pulley; the fourth upward-traction guide pulley is mounted right below the third upward-traction guide pulley, a pulley direction of the fourth upward-traction guide pulley is orthogonal to a pulley direction of the third upward-traction guide pulley, and the circle of a slide path of the fourth upward-traction guide pulley is tangent to the middle section of the framework base; the fifth upward-traction guide pulley is mounted on a lateral side of the framework base at the same height and in the same plane as the fourth upward-traction guide pulley, and coincides with the middle section of the slide path of the fourth upward-traction guide pulley; and the sixth upward-traction guide pulley is mounted on the upper side of a beam where the fifth upward-traction guide pulley is located, and the middle section of a slide path of the sixth upward-traction guide pulley is tangent to the right side of the circle of a slide path of the fifth upward-traction guide pulley.

The double guide pulley is mounted on the lower rectangular frame right below the first upward-traction guide pulley; two coaxial pulleys of the double guide pulley can turn in opposite directions; and the double guide pulley is able to slide on an arc-shaped guide rail by taking the innermost ridge of the corresponding vertical frame edge as a rotation axis.

The first downward-traction guide pulley is mounted on a vertical frame edge and located inside the upper three-dimensional space of the static platform framework, and a symmetry plane of the pulley coincides with a diagonal plane of the vertical frame edge; the second downward-traction guide pulley is mounted at the inner side of the lower rectangular frame at the left with respect to the first downward-traction guide pulley, and the middle section of a slide path of the pulley is parallel to a plane where it is located; and the third downward-traction guide pulley is mounted at the inner side of a corresponding beam of the framework base right below the beam where the second downward-traction guide pulley is located.

The first rotation-traction guide pulley is mounted right below the first downward-traction guide pulley; the second rotation-traction guide pulley is mounted at the inner side of a corresponding beam of the lower rectangular frame below the second upward-traction guide pulley, and the middle section of a slide path of the pulley is parallel to its mounting surface; and the third rotation-traction guide pulley is mounted at the inner side of a corresponding beam of the framework base right below the beam where the second rotation-traction guide pulley is located.

The flexible-rope-guided pulley train implemented with the foregoing structure guarantees non-interference between the pulleys; between upward-traction flexible ropes, downward-traction flexible ropes, and rotation-traction flexible ropes; and between these upward-traction flexible ropes, between these downward-traction flexible ropes, and between these rotation-traction flexible ropes during operation.

The first upward-traction guide pulley includes a pulley, a deep groove ball bearing, a shoulder screw, a retaining ring, a hexagon nut, a pulley bracket, a slider, an arc-shaped guide rail, a 90-degree arc-shaped guide rail baseplate, bracket screws, guide rail mounting screws, and guide rail baseplate mounting bolts.

The deep groove ball bearing has an interference fit with an inner hole of the pulley, and is located at the middle in a pulley thickness direction. The shoulder screw successively passes through one lateral plate of the pulley bracket, the retaining ring, the deep groove ball bearing, and the other lateral plate of the pulley bracket, and is finally fastened by the hexagon nut. A pulley bracket baseplate is fastened to the slider via bracket screws; the arc-shaped guide rail is connected to the arc-shaped guide rail baseplate via the guide rail mounting screws. Two ends of the arc-shaped guide rail baseplate are respectively connected to two adjoining beams of the upper rectangular frame, and a centerline of the corresponding vertical frame edge passes through the geometric circle center of the arc-shaped guide rail. In this way, the first upward-traction guide pulley can change the angles between the pulley and the beams of the upper rectangular frame under different states of the upward-traction flexible ropes, thus ensuring that the flexible ropes always act a positive pressure on the pulley, and avoiding derailment.

The drive mechanisms include four upward-traction drive mechanisms, four downward-traction drive mechanisms, and four rotation-traction drive mechanisms, where rotation shafts of the upward-traction drive mechanisms are parallel to a pulley axis of the sixth upward-traction guide pulley, and are mounted on the framework base; rotation shafts of the downward-traction drive mechanisms are parallel to a pulley axis of the third downward-traction guide pulley, and are mounted on the framework base; and rotation shafts of the rotation-traction drive mechanisms are parallel to a pulley axis of the third rotation-traction guide pulley, and are mounted on the framework base.

The remaining pulley sets are similar to the first upward-traction guide pulley in the composition, and mounting and fixing manners.

The upward-traction drive mechanism includes a servo motor, a speed reducer, a motor bracket, a coupler, a long-shaft ring flange, a ring flange, a flexible rope roller, a roller support side plate, a roller support baseplate, a flexible rope fastening pan head screw, and a bearing.

The servo motor is connected and mounted at one end of the speed reducer via a bolt, and the speed reducer is mounted on the motor bracket; the flexible rope roller is provided with grooves; the flexible rope fastening pan head screw is used to fasten one end of the flexible transmission rope to the roller; the ring flange is mounted at one side of the flexible rope roller, and the long-shaft ring flange is mounted at the other side thereof; the ring flange and the long-shaft ring flange are separately connected to the roller support side plate via the bearing, and the roller support side plate is connected and mounted onto the roller support baseplate via a bolt; the shaft of the long-shaft ring flange is coupled to an output shaft of the speed reducer via the coupler; and the motor bracket and the roller support baseplate are separately fastened onto the framework base via bolts.

The downward-traction drive mechanism and the rotation-traction drive mechanism are identical with the upward-traction drive mechanism in structure, so the details are not described herein again.

The workpiece conveying mechanism is a chain conveyor belt mechanism, and spans inside the static platform framework as a support platform for placement of a workpiece; and a conveyor belt mechanism main body is fixed to the lower rectangular frame via bolts.

The moving platform includes a casing, moving platform pullet sets, a universal joint inner ring holder, an inner ring bearing, a universal joint outer ring, an outer ring bearing, an outer ring bearing pedestal, a spray gun, and lifting lugs.

The casing has a hollow cavity enclosed by five sides, where a large round hole is made in the middle of the bottom surface and small holes are made in the four corners respectively; and the moving platform pullet sets are respectively mounted at the four corners of the inner bottom surface of the casing; the lifting lugs are mounted at the eight corners of the casing respectively; the spray gun is mounted below the universal joint inner ring holder, and shafts of the spray gun at the two ends fit into inner holes at the two ends of the universal joint outer ring via the inner ring bearing; two end shafts of the universal joint outer ring fit into the outer ring bearing pedestal via the outer ring bearing; and the outer ring bearing pedestal is mounted at the bottom of the casing.

The foregoing structure realizes two degrees of freedom of rotation of the universal joint inner ring about the x and y axes with respect to the casing. Four corners at the top and bottom of the casing are connected to the upward-traction flexible ropes and the downward-traction flexible ropes respectively via the lifting lugs. The rotation-traction flexible ropes pass through small holes in the bottom plate from below, and are wound around the moving platform pullet sets and then connected to four pull rings above the universal joint inner ring.

The flexible transmission ropes include upward-traction flexible ropes, downward-traction flexible ropes, and rotation-traction flexible ropes.

The upward-traction flexible ropes tilt up respectively from the lifting lugs at the upper four corners of the moving platform casing, change directions through the first upward-traction guide pulley to tilt down, come to the third upward-traction guide pulley through the second upward-traction guide pulley, then go downwards vertically along the vertical frame edges through the pulley, change by 90 degrees through the fourth upward-traction guide pulley to go along the outer side of the framework base, change directions through the fifth upward-traction guide pulley to go upwards vertically, and change directions through the sixth upward-traction guide pulley to tilt forward to the upward-traction drive mechanisms.

The downward-traction flexible ropes tilt down respectively from the lifting lugs at the lower four corners of the moving platform casing, pass through the downward-traction guide pulley of the double guide pulley and then go upwards along the vertical frame edges, change directions through the first downward-traction guide pulley to go downwards along the vertical frame edges, and slightly adjust directions through the second downward-traction guide pulley; and after passing through the third downward-traction guide pulley, the flexible ropes go along the beams where they are located to the downward-traction drive mechanisms.

The rotation-traction flexible ropes are wound around the moving platform pullet sets from the pull rings on the universal joint inner ring holder of the moving platform; tilt down and pass through the double guide pulley, the first rotation-traction guide pulley, the second rotation-traction guide pulley; and finally come to the rotation-traction drive mechanisms through the third rotation-traction guide pulley.

A method for operating a flexible-rope-driven hybrid spray painting robot mechanism includes the following steps:

(1) placing, by a loading device, a workpiece on a workpiece conveying mechanism;

(2) conveying, by the workpiece conveying mechanism, the workpiece to a designated spraying work point, and stopping operation to realize fixing of the workpiece;

(3) controlling, by upward-traction drive flexible ropes and downward-traction drive flexible ropes in parallel, three degrees of freedom of translation of a moving platform; driving, by rotation-traction flexible ropes, an end spray gun connected in series to the moving platform, and controlling two degrees of freedom of rotation of the end spray gun with respect to the moving platform to realize movement of the spray gun for a spraying operation;

(4) starting the conveying mechanism after the end spray gun completes the spraying operation, to convey the processed workpiece out of a spraying area; and (5) transporting, by a transport device, the processed workpiece to an area for a next process.

In the flexible-rope-driven hybrid spray painting robot mechanism that is designed by the present invention, the static platform is divided into upper and lower two three-dimensional spaces. The upper three-dimensional space is an accessible space for the moving platform, which contains a working space of the spray gun. Drive devices are sequentially disposed together in the lower three-dimensional space, thus easily avoiding the possibility of explosion due to ignition of combustible gas in the working space of the spray gun caused by electric sparks from drive lines. The flexible transmission ropes drag the moving platform casing by using the guide pulleys attached to the static platform framework. Four upward-traction flexible ropes pull the moving platform casing upwards, four downward-traction flexible ropes pull the moving platform casing downwards, thus realizing parallel control of translation of the moving platform casing. The end spray gun is connected in series onto the moving platform casing via the universal joint outer ring and the universal joint inner ring holder. Four rotation-traction flexible ropes drag the universal joint inner ring holder which carries the spray gun, thus realizing two degrees of freedom of rotation of the spray gun in series connection to the moving platform casing. When the moving platform changes in position in the upper three-dimensional space, the first upward-traction guide pulley and the double guide pulley also change in position according to a change in angles between the flexible ropes and the framework, so that the flexible ropes always act a positive effect on the slide paths of the pulleys.

The present invention has the following advantages:

1. The use of a flexible-rope-driven mechanism to control movement of the spray gun can achieve a small movement inertia of the spray gun, good dynamic characteristics, a large working space, high-speed spraying, a simple structure, and convenient maintenance and repair.

2. The structure designed by the present invention retains the characteristics of stable movement and good dynamic characteristics of a transmission parallel mechanism. The addition of a series structure enables more flexible change in end posture and further avoids the defect of a large inertia of the conventional series robotic arm.

3. By means of driving with two-layer parallel flexible ropes, a translational degree of freedom of the spray gun in x, y, and z directions and a rotational degree of freedom thereof about the x and y axes can be independently controlled.

4. Arc-shaped guide rails are used for the first upward-traction guide pulley and the double guide pulley, so that the pulley bracket can change in angle with the dragging directions of the flexible ropes, thus ensuring that the flexible ropes always act a positive effect on the slide paths of the pulleys and avoiding derailment of the flexible ropes.

5. The drive devices are disposed together in the bottom-layer space of the static platform that is isolated from a working space of the spray gun, thus easily preventing explosion.

DETAILED DESCRIPTION OF THE EMBODIMENTS

Figure 1:
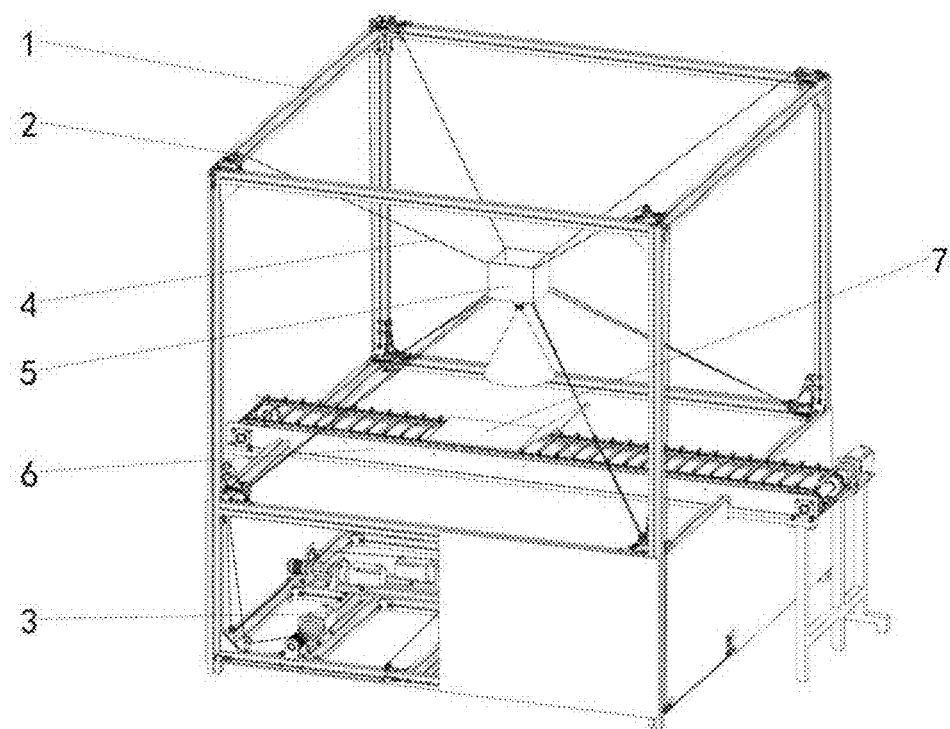
FIG. 1 is a schematic three-dimensional diagram of a whole structure of the present invention.
Figure 2:
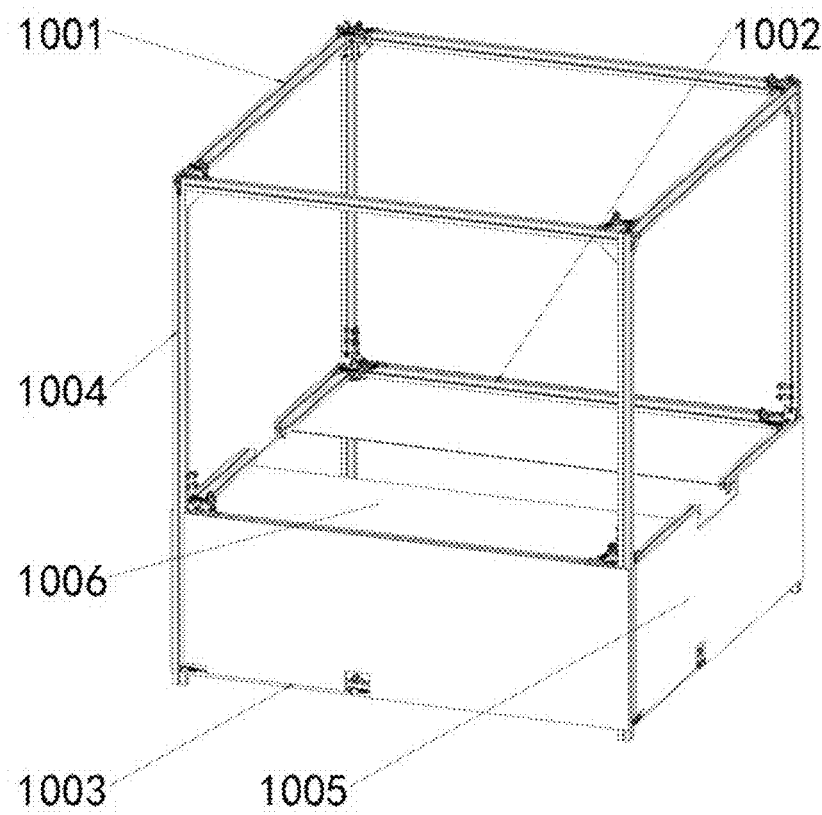
FIG. 2 is a schematic three-dimensional diagram of a static platform framework in FIG. 1.
Figure 3:
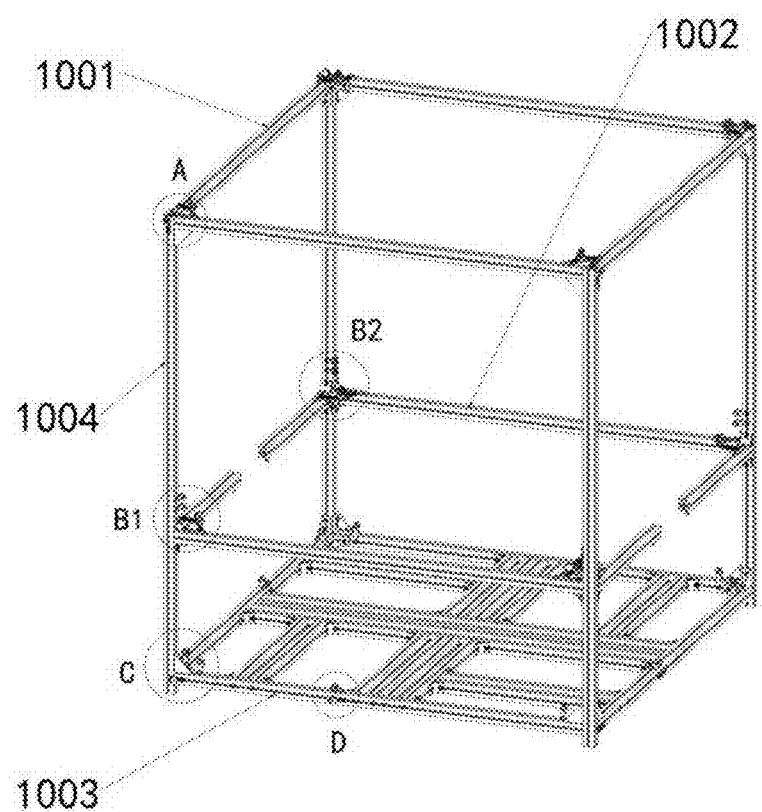
FIG. 3 shows mounting positions and distribution of flexible-rope-guided pulley sets in FIG. 1.
Figure 4:
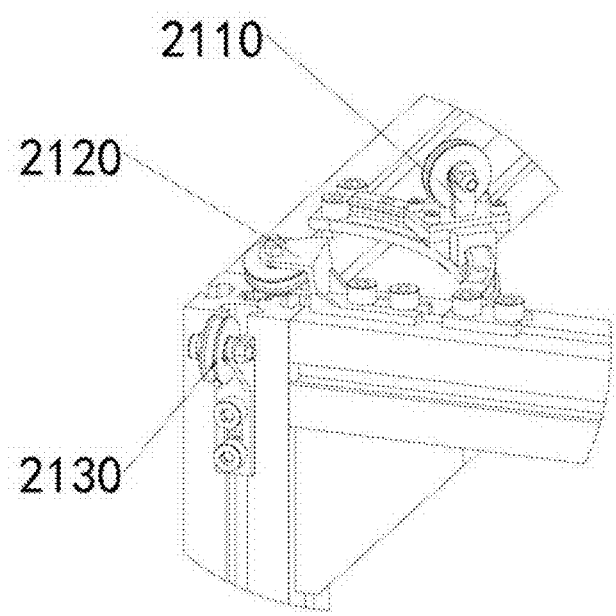
FIG. 4 is a partial view of a place A in FIG. 3.
Figure 5:
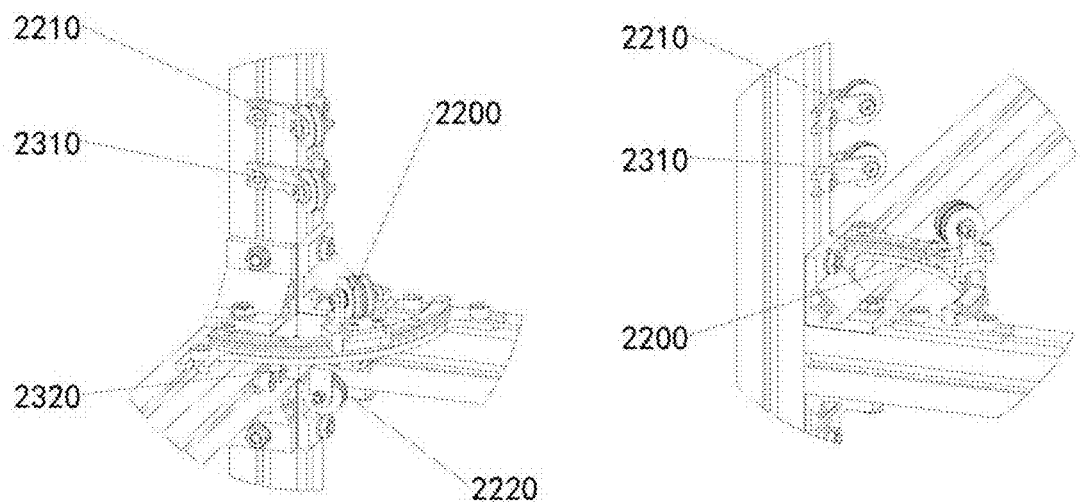
FIG. 5 shows partial views of places B1 (at the right) and B2 (at the left) in FIG. 3.
Figure 6:
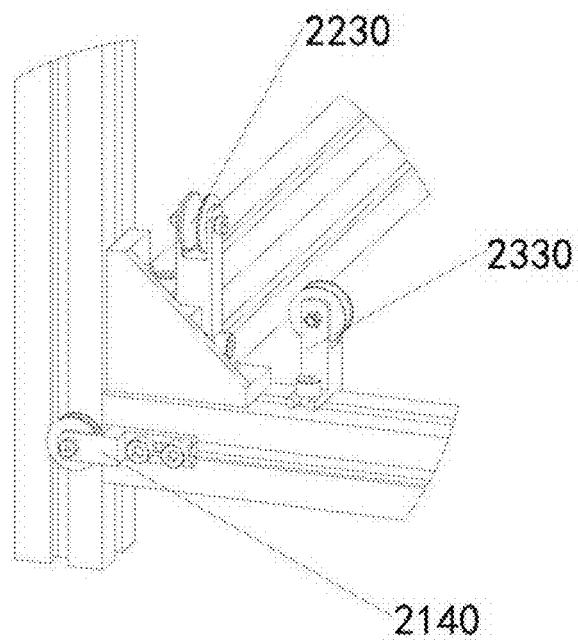
FIG. 6 is a partial view of a place C in FIG. 3.
Figure 7:
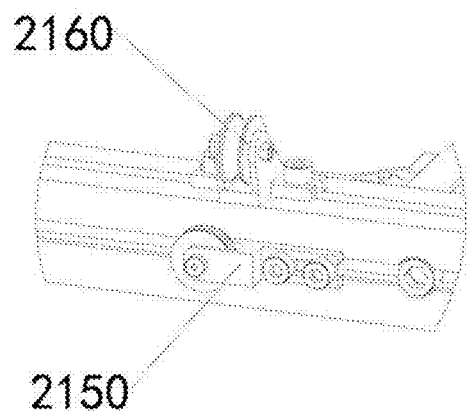
FIG. 7 is a partial view of a place D in FIG. 3.

With reference to FIGS. 1, 2, 3, 10, 11, 12, and 13, a flexible-rope-driven hybrid spray painting robot mechanism is composed of a static platform framework 1, a flexible-rope-guided pulley train 2, drive mechanisms 3, flexible transmission ropes 4, a moving platform 5, and a workpiece conveying mechanism 6.

The static platform framework 1 is formed by an upper rectangular frame 1001, a lower rectangular frame 1002, a framework base 1003, vertical frame edges 1004, lateral barrier plates 1005, and a bottom barrier plate 1006. The four vertical frame edges 1004 connect the upper rectangular frame 1001, the lower rectangular frame 1002, and the framework base 1003, to form upper and lower two three-dimensional spaces. The upper three-dimensional space is a movement space for the moving platform 5, and the lower three-dimensional space is used to accommodate the drive mechanisms 3. The lateral barrier plates 1005 are respectively mounted at the four lateral sides of the lower three-dimensional space, and the bottom barrier plate 1006 is mounted on the lower rectangular frame 1002. The flexible-rope-guided pulley train 2 attaches to and is mounted on the whole static platform framework. Four flexible-rope-guided pulley trains 2 in total are distributed circumferentially on the static platform framework 1, and are used to guide the flexible transmission ropes 4. The workpiece conveying mechanism 6 passes through the upper three-dimensional space from below and is connected to the lower rectangular frame 1002, so as to realize automatic fixing of a workpiece 7.

With reference to FIGS. 3, 4, 5, 6, and 7, further, the flexible-rope-guided pulley train 2 includes a first upward-traction guide pulley 2110, a second upward-traction guide pulley 2120, a third upward-traction guide pulley 2130, a fourth upward-traction guide pulley 2140, a fifth upward-traction guide pulley 2150, a sixth upward-traction guide pulley 2160, a double guide pulley 2200, a first downward-traction guide pulley 2210, a second downward-traction guide pulley 2220, a third downward-traction guide pulley 2230, a first rotation-traction guide pulley 2310, a second rotation-traction guide pulley 2320, and a third rotation-traction guide pulley 2330.

The first upward-traction guide pulley 2110 is mounted on a corner of the upper rectangular frame 1001, and the geometric circle center of the first upward-traction guide pulley falls on the axis of a vertical frame edge 1004 where it is located, so that the first upward-traction guide pulley can freely slide on a 90-degree arc-shaped slide rail. The second upward-traction guide pulley 2120 is mounted on a beam of the upper rectangular frame 1001 that is on a clockwise direction in which the first upward-traction guide pulley 2110 turns around the axis of its corresponding vertical frame edge 1004, and the circle of a slide path of the second upward-traction guide pulley is always tangent to the middle section of a slide path of the first upward-traction guide pulley. The third upward-traction guide pulley 2130 is mounted on a vertical frame edge at the right side of the second upward-traction guide pulley 2120, and a symmetry plane of the third upward-traction guide pulley is kept passing through the central axis of the vertical frame edge. The circle of a slide path of the third upward-traction guide pulley is tangent to the middle section of the slide path of the second upward-traction guide pulley. The fourth upward-traction guide pulley 2140 is mounted right below the third upward-traction guide pulley 2130, and a pulley direction of the fourth upward-traction guide pulley is orthogonal to a pulley direction of the third upward-traction guide pulley. The circle of a slide path of the fourth upward-traction guide pulley is tangent to the middle section of the framework base. The fifth upward-traction guide pulley 2150 is mounted on a lateral side of the framework base at the same height and in the same plane as the fourth upward-traction guide pulley 2140, and coincides with the middle section of the slide path of the fourth upward-traction guide pulley. The sixth upward-traction guide pulley 2160 is mounted on the upper side of a beam where the fifth upward-traction guide pulley is located, and the middle section of a slide path of the sixth upward-traction guide pulley is tangent to the right side of the circle of a slide path of the fifth upward-traction guide pulley.

The double guide pulley 2200 is mounted on the lower rectangular frame 1002 right below the first upward-traction guide pulley 2110. Two coaxial pulleys of the double guide pulley can turn in opposite directions, and are respectively used for guiding downward-traction flexible ropes and rotation-traction flexible ropes. The double guide pulley 2200 can slide on an arc-shaped guide rail by taking the innermost ridge of the corresponding vertical frame edge 1004 as a rotation axis.

The first downward-traction guide pulley 2210 is mounted on a vertical frame edge and located inside the upper space. A symmetry plane of the pulley coincides with a diagonal plane of the vertical frame edge. The second downward-traction guide pulley 2220 is mounted at the inner side of the lower rectangular frame at the left with respect to the first downward-traction guide pulley 2210, and the middle section of a slide path of the pulley is parallel to a plane where it is located. The third downward-traction guide pulley 2230 is mounted at the inner side of a corresponding beam of the framework base 1003 right below the beam where the second downward-traction guide pulley 2220 is located.

The first rotation-traction guide pulley 2310 is mounted right below the first downward-traction guide pulley 2210, and has the same mounting form as the first downward-traction guide pulley. However, a distance from the axis of the first rotation-traction guide pulley to a ridge of the corresponding vertical frame edge 1004 is 5 mm farther than a distance from the axis of the first downward-traction guide pulley to the same ridge. The second rotation-traction guide pulley 2320 is mounted at the inner side of a corresponding beam of the lower rectangular frame 1002 below the second upward-traction guide pulley 2120, and the middle section of a slide path of the pulley is parallel to its mounting surface. The third rotation-traction guide pulley 2330 is mounted at the inner side of a corresponding beam of the framework base 1003 right below the beam where the second rotation-traction guide pulley 2320 is located.

The flexible-rope-guided pulley train implemented with the foregoing structure guarantees non-interference between the pulleys; between upward-traction flexible ropes, downward-traction flexible ropes, and rotation-traction flexible ropes; and between these upward-traction flexible ropes, between these downward-traction flexible ropes, and between these rotation-traction flexible ropes during operation.

Figure 8:
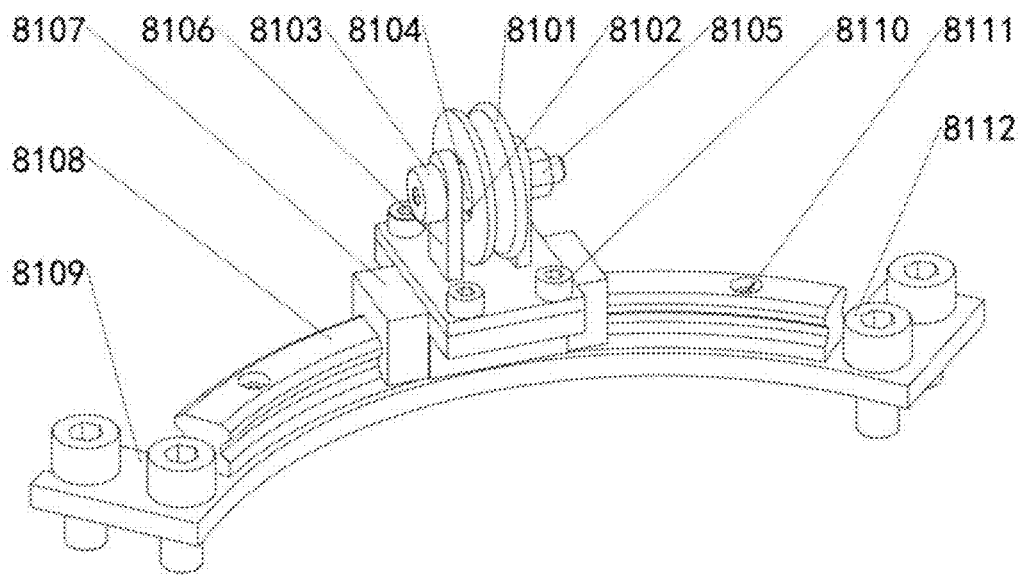
FIG. 8 is a schematic three-dimensional diagram of a first upward-traction guide pulley in FIG. 3.
Figure 9:
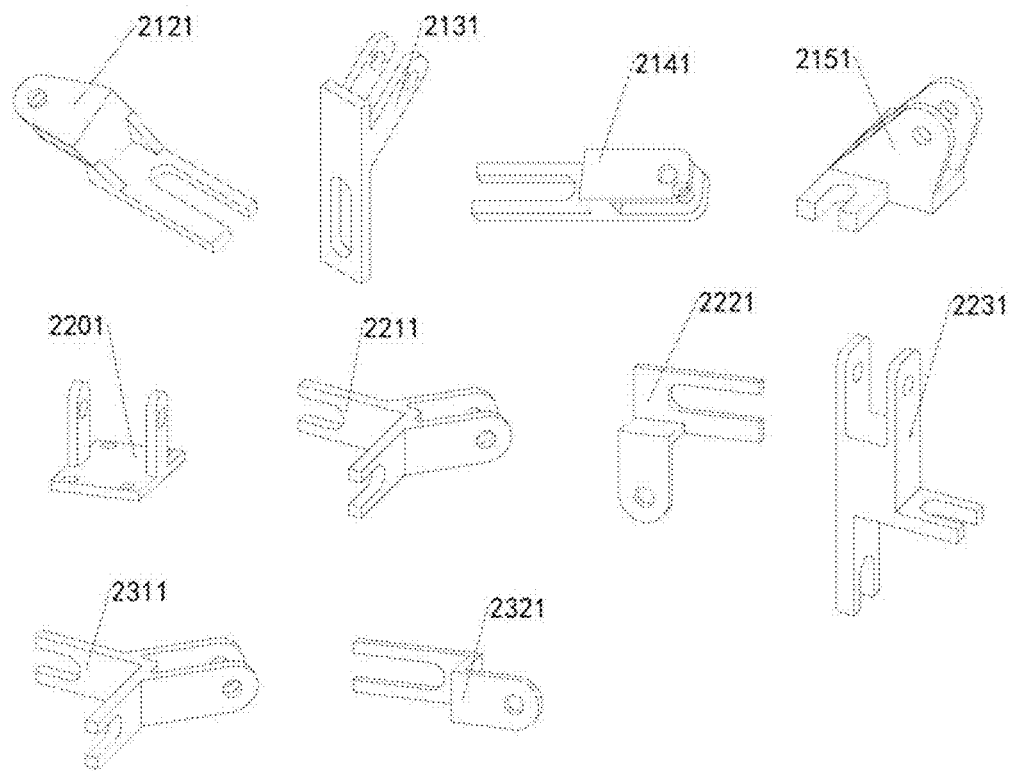
FIG. 9 is a schematic three-dimensional diagram of pulley brackets for different pullet sets in FIG. 3.

With reference to FIGS. 8 and 9, further, the first upward-traction guide pulley 2110 includes a pulley 8101, a deep groove ball bearing 8102, a shoulder screw 8103, a retaining ring 8104, a hexagon nut 8105, a pulley bracket 8106, a slider 8107, an arc-shaped guide rail 8108, a 90-degree arc-shaped guide rail baseplate 8109, bracket screws 8110, guide rail mounting screws 8111, and guide rail baseplate mounting bolts 8112.

The deep groove ball bearing 8102 has an interference fit with an inner hole of the pulley 8101, and is located at the middle in a pulley thickness direction. The shoulder screw 8103 successively passes through one lateral plate of the pulley bracket 8106, the retaining ring 8104, the deep groove ball bearing 8102, and the other lateral plate of the bracket 8106; and is finally fastened by the hexagon nut 8105. A pulley bracket baseplate is fastened to the slider 8107 via bracket screws 8110. The arc-shaped guide rail 8108 is connected to the arc-shaped guide rail baseplate 8109 via the guide rail mounting screws 8111. Two ends of the arc-shaped guide rail baseplate 8109 are respectively connected to two adjoining beams of the upper rectangular frame 1001, and a centerline of the corresponding vertical frame edge 1004 passes through the geometric circle center of the arc-shaped guide rail. By such arrangement, the first upward-traction guide pulley 2110 can change the angles between the pulley and the beams of the upper rectangular frame under different states of the upward-traction flexible ropes, thus ensuring that the flexible ropes always act a positive pressure on the pulley, and avoiding derailment.

The remaining pulley sets are similar to the first upward-traction guide pulley 2110 in the composition, and mounting and fixing manners, so the details are not described herein again. However, there are further the following details:

the second upward-traction guide pulley 2120 includes a first pulley bracket 2121;

the third upward-traction guide pulley 2130 includes a second pulley bracket 2131;

the fourth upward-traction guide pulley 2140 includes a third pulley bracket 2141;

the fifth upward-traction guide pulley 2150 is identical with the fourth upward-traction guide pulley 2140;

the sixth upward-traction guide pulley 2160 includes a fourth pulley bracket 2151;

the double guide pulley 2200 includes a fifth pulley bracket 2201 and a 120-degree arc-shaped guide rail;

the first downward-traction guide pulley 2210 includes a sixth pulley bracket 2211;

the second downward-traction guide pulley 2220 includes a seventh pulley bracket 2221;

the third downward-traction guide pulley 2230 includes an eighth pulley bracket 2231;

the first rotation-traction guide pulley 2310 includes a ninth pulley bracket 2311;

the second rotation-traction guide pulley 2320 includes a tenth pulley bracket 2321; and the third rotation-traction guide pulley 2330 is identical with the third downward-traction guide pulley 2230.

Figure 10:
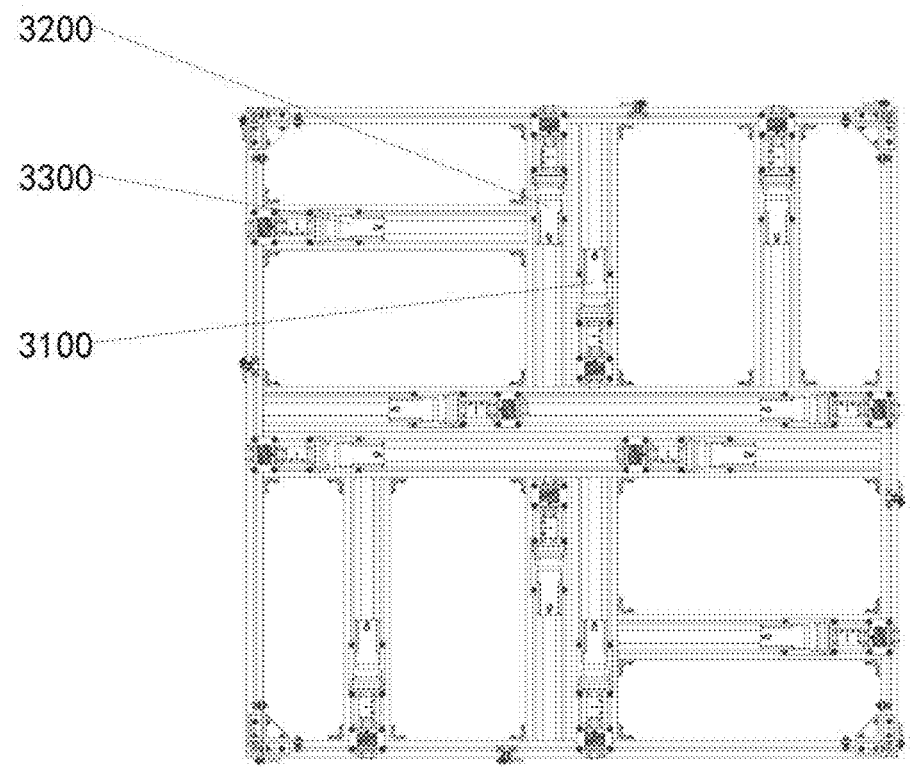
FIG. 10 is a schematic three-dimensional diagram of mounting positions of drive mechanisms in FIG. 1.

With reference to FIG. 10, further, the drive mechanisms 3 include four upward-traction drive mechanisms 3100, four downward-traction drive mechanisms 3200, and four rotation-traction drive mechanisms 3300. Rotation shafts of the upward-traction drive mechanisms 3100 are parallel to a pulley axis of the sixth upward-traction guide pulley 2160, and are mounted on the framework base 1003. Rotation shafts of the downward-traction drive mechanisms 3200 are parallel to a pulley axis of the third downward-traction guide pulley 2230, and are mounted on the framework base 1003. Rotation shafts of the rotation-traction drive mechanisms 3300 are parallel to a pulley axis of the third rotation-traction guide pulley 2330, and are mounted on the framework base 1003.

Figure 11:
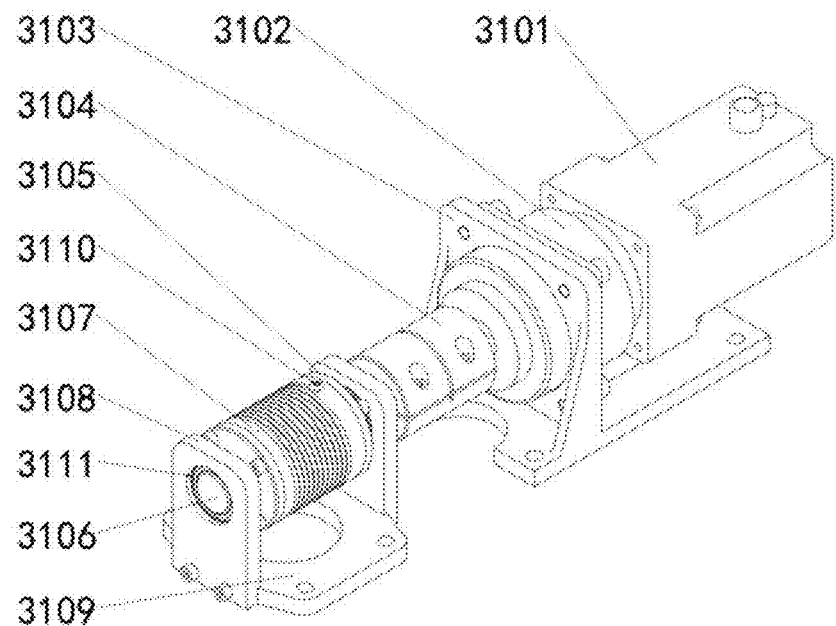
FIG. 11 is a schematic three-dimensional diagram of an upward-traction drive mechanism in FIG. 10.

With reference to FIG. 11, further, the upward-traction drive mechanism 3100 includes a servo motor 3101, a speed reducer 3102, a motor bracket 3103, a coupler 3104, a long-shaft ring flange 3105, a ring flange 3106, a flexible rope roller 3107, a roller support side plate 3108, a roller support baseplate 3109, a flexible rope fastening pan head screw 3110, and a bearing 3111.

The servo motor 3101 is connected and mounted at one end of the speed reducer 3102 via a bolt, and the speed reducer 3102 is mounted on the motor bracket 3103. The flexible rope roller 3107 is provided with grooves. The flexible rope fastening pan head screw 3110 is used to fasten one end of the flexible rope 4 to the roller 3107. The ring flange 3106 is mounted at one side of the flexible rope roller 3107, and the long-shaft ring flange 3105 is mounted at the other side thereof. The ring flange and the long-shaft ring flange are separately connected to the roller support side plate 3108 via the bearing 3111, and the roller support side plate 3108 is connected and mounted onto the roller support baseplate 3109 via a bolt. The shaft of the long-shaft ring flange 3105 is coupled to an output shaft of the speed reducer 3102 via the coupler 3104. The motor bracket 3103 and the roller support baseplate 3109 are separately fastened onto the framework base 1003 via bolts.

The downward-traction drive mechanism 3200 and the rotation-traction drive mechanism 3300 are identical with the upward-traction drive mechanism 3100 in structure, so the details are not described herein again.

With reference to FIG. 1, further, the workpiece conveying mechanism 6 is a chain conveyor belt mechanism, and spans inside the static platform framework 1 as a support platform for placement of a workpiece. A conveyor belt mechanism main body is fixed to the lower rectangular frame 1002 via bolts, thus easily realizing fixing of the workpiece during spraying.

Figure 12:
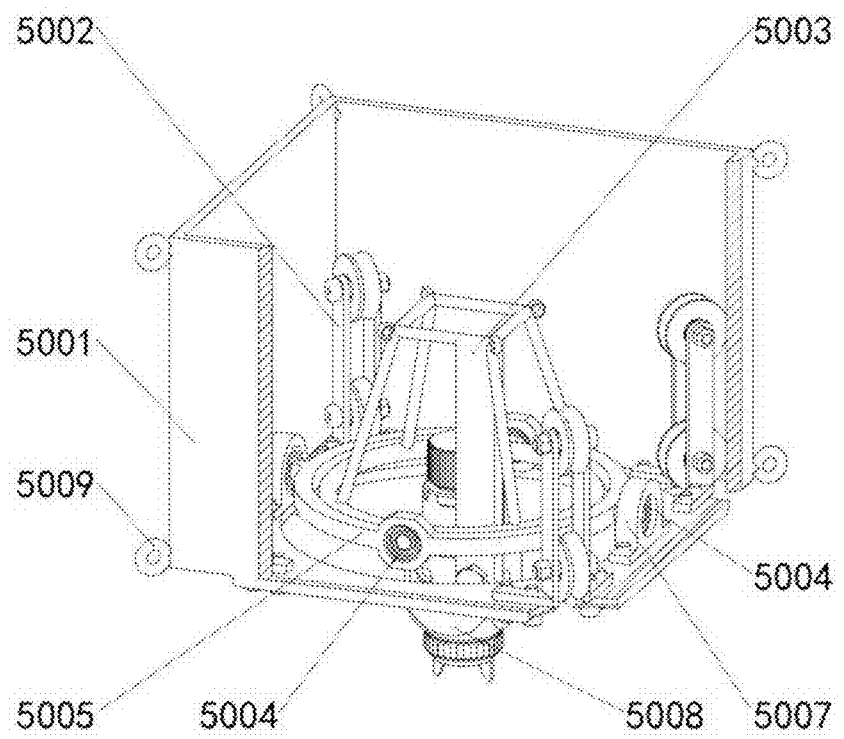
FIG. 12 is a schematic three-dimensional diagram of a moving platform in FIG. 1.
Figure 13:
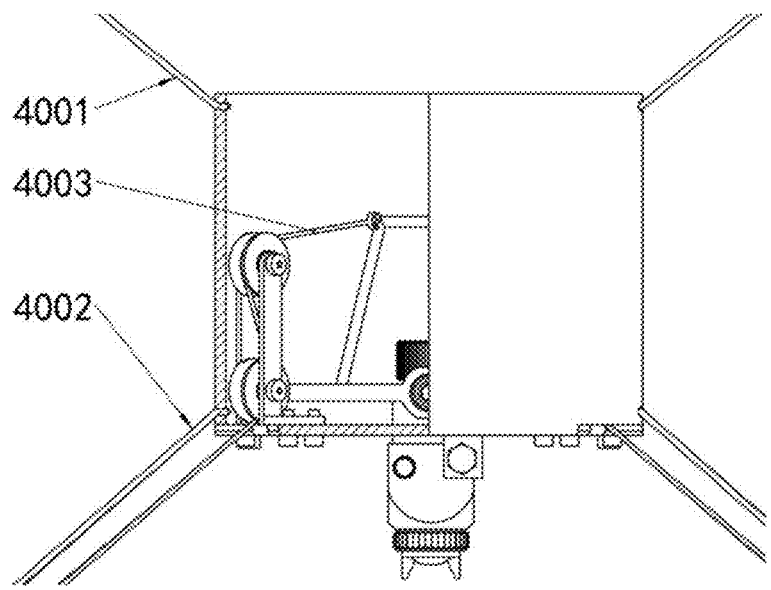
FIG. 13 is a schematic three-dimensional diagram of flexible ropes in FIG. 1.
Figure 14:
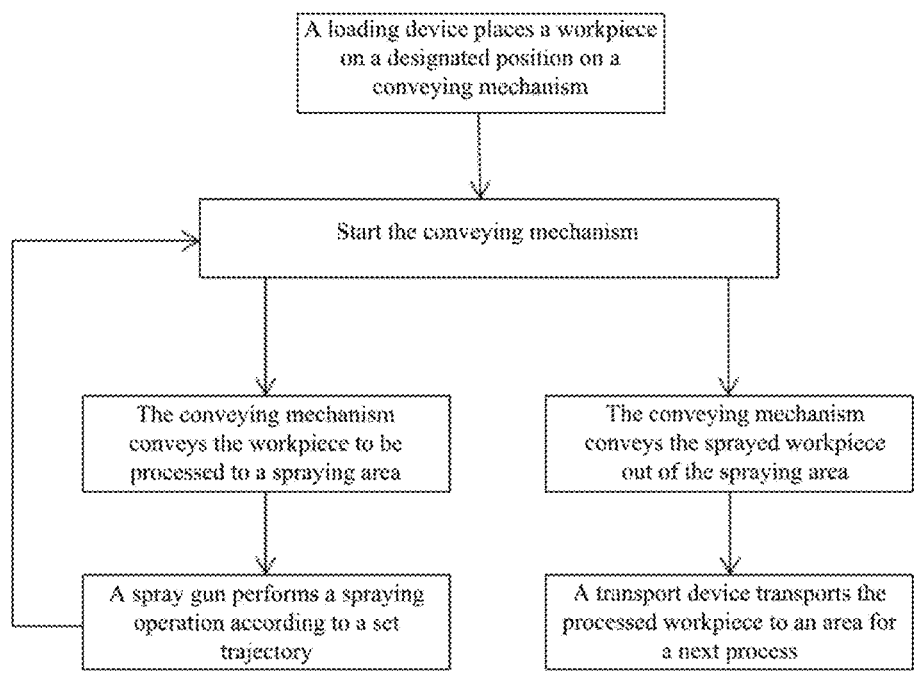
FIG. 14 is a flowchart of an operating method of a robot of the present invention.

With reference to FIG. 12, further, the moving platform 5 includes a casing 5001, moving platform pullet sets 5002, a universal joint inner ring holder 5003, an inner ring bearing 5004, a universal joint outer ring 5005, an outer ring bearing 5006, an outer ring bearing pedestal 5007, a spray gun 5008, and lifting lugs 5009.

The casing 5001 has a hollow cavity enclosed by five sides, where a large round hole is made in the middle of the bottom surface and small holes are made in the four corners respectively. The moving platform pullet sets 5002 are respectively mounted at the four corners of the inner bottom surface of the casing. The lifting lugs 5009 are mounted at the eight corners of the casing respectively, and used for connection of the flexible transmission ropes 4. The spray gun 5008 is mounted below the universal joint inner ring holder 5003, and shafts of the spray gun at the two ends fit into inner holes at the two ends of the universal joint outer ring 5005 via the inner ring bearing 5004. Two end shafts of the universal joint outer ring 5005 fit into the outer ring bearing pedestal 5007 via the outer ring bearing 5006. The outer ring bearing pedestal 5007 is mounted at the bottom of the casing 5001.

The foregoing structure realizes two degrees of freedom of rotation of the universal joint inner ring about the x and y axes with respect to the casing. Four corners at the top and bottom of the casing are connected to the upward-traction flexible ropes and the downward-traction flexible ropes respectively via the lifting lugs 5009. The rotation-traction flexible ropes pass through small holes in the bottom plate from below, and are wound around the moving platform pullet sets and then connected to four pull rings above the universal joint inner ring.

With reference to FIGS. 3, 4, 5, 6, 7, and 13, further, the flexible transmission ropes 4 include the upward-traction flexible ropes 4001, the downward-traction flexible ropes 4002, and the rotation-traction flexible ropes 4003.

The upward-traction flexible ropes 4001 tilt up respectively from the lifting lugs 5009 at the upper four corners of the moving platform casing, change directions through the first upward-traction guide pulley 2110 to tilt down, come to the third upward-traction guide pulley 2130 through the second upward-traction guide pulley 2120, then go downwards vertically along the vertical frame edges through the pulley 3, change by 90 degrees through the fourth upward-traction guide pulley 2140 to go along the outer side of the framework base, change directions through the fifth upward-traction guide pulley 2150 to go upwards vertically, and change directions through the sixth upward-traction guide pulley 2160 to tilt forward to the upward-traction drive mechanisms 3100.

The downward-traction flexible ropes 4002 tilt down respectively from the lifting lugs 5009 at the lower four corners of the moving platform casing, pass through the downward-traction guide pulley of the double guide pulley 2200 and then go upwards along the vertical frame edges, change directions through the first downward-traction guide pulley 2210 to go downwards along the vertical frame edges, and slightly adjust directions through the second downward-traction guide pulley 2220. After passing through the third downward-traction guide pulley 2230, the flexible ropes go along the beams where they are located to the downward-traction drive mechanisms 3200.

The rotation-traction flexible ropes 4003 are wound around the moving platform pullet sets 5002 from the pull rings on the universal joint inner ring holder 5003 of the moving platform; tilt down and pass through the double guide pulley 2200, the first rotation-traction guide pulley 2310, and the second rotation-traction guide pulley 2320; and finally come to the rotation-traction drive mechanisms 3300 through the third rotation-traction guide pulley 2330.

With reference to FIGS. 1 to 14, a method for implementing the flexible-rope-driven hybrid spray painting robot mechanism designed by the present invention is described below.

(1) placing, by a loading device, a workpiece on a conveying mechanism;

(2) conveying, by the conveying mechanism, the workpiece to a designated spraying work point, and stopping operation to realize fixing of the workpiece;

(3) controlling, by upward-traction drive flexible ropes and downward-traction drive flexible ropes in parallel, three degrees of freedom of translation of a moving platform; and driving, by rotation-traction flexible ropes, an end spray gun connected in series to the moving platform, and controlling two degrees of freedom of rotation of the end spray gun with respect to the moving platform to realize flexible and high-speed movement (the cone in FIG. 1 indicates a spraying and atomization area) of the spray gun for a spraying operation;

(4) starting the conveying mechanism after the end spray gun completes the spraying operation, to convey the processed workpiece out of the spraying area; and (5) transporting, by a transport device, the processed workpiece to an area for a next process.

What is claimed is:

1. A flexible-rope-driven hybrid spray painting robot mechanism, comprising:
   a static platform framework having upper and lower two three-dimensional spaces;
   a workpiece conveying mechanism mounted at the bottom of the upper three-dimensional space of the static platform framework;
   drive mechanisms mounted at the bottom of the lower three-dimensional space of the static platform framework;
   a moving platform moving in the upper three-dimensional space of the static platform framework, wherein a spray gun is mounted on the moving platform;
   flexible transmission ropes connected to the moving platform at the ends and connected to the drive mechanisms at the other ends; and
   a flexible-rope-guided pulley train mounted on the whole static platform framework and used to realize guiding of the flexible transmission ropes;
   wherein the drive mechanisms drive the flexible transmission ropes to control three degrees of freedom of translation of the moving platform and two degrees of freedom of rotation of the spray gun with respect to the moving platform, thus realizing spraying of a workpiece on the workpiece conveying mechanism.

2. The flexible-rope-driven hybrid spray painting robot mechanism according to claim 1, wherein the static platform framework is formed by an upper rectangular frame, a lower rectangular frame, a framework base, vertical frame edges, lateral barrier plates, and a bottom barrier plate; the four vertical frame edges connect the upper rectangular frame, the lower rectangular frame, and the framework base, to form upper and lower two three-dimensional spaces; the upper three-dimensional space is a movement space for the moving platform, and the lower three-dimensional space is used to accommodate the drive mechanisms; the lateral barrier plates are respectively mounted at the four lateral sides of the lower three-dimensional space, and the bottom barrier plate is mounted on the lower rectangular frame; four flexible-rope-guided pulley trains in total are distributed circumferentially on the static platform framework, and are used to guide the flexible transmission ropes; and the workpiece conveying mechanism passes through the upper three-dimensional space from below and is connected to the lower rectangular frame, so as to realize automatic fixing of the workpiece.

3. The flexible-rope-driven hybrid spray painting robot mechanism according to claim 2, wherein the flexible-rope-guided pulley train comprises a first upward-traction guide pulley, a second upward-traction guide pulley, a third upward-traction guide pulley, a fourth upward-traction guide pulley, a fifth upward-traction guide pulley, a sixth upward-traction guide pulley, a double guide pulley, a first downward-traction guide pulley, a second downward-traction guide pulley, a third downward-traction guide pulley, a first rotation-traction guide pulley, a second rotation-traction guide pulley, and a third rotation-traction guide pulley;

the first upward-traction guide pulley is mounted on a corner of the upper rectangular frame, and the geometric circle center of the first upward-traction guide pulley falls on the axis of a vertical frame edge where it is located, so that the first upward-traction guide pulley is able to freely slide on a 90-degree arc-shaped slide rail; the second upward-traction guide pulley is mounted on a beam of the upper rectangular frame that is on a clockwise direction in which the first upward-traction guide pulley turns around the axis of its corresponding vertical frame edge, and the circle of a slide path of the second upward-traction guide pulley is always tangent to the middle section of a slide path of the first upward-traction guide pulley; the third upward-traction guide pulley is mounted on a vertical frame edge at the right side of the second upward-traction guide pulley, a symmetry plane of the third upward-traction guide pulley is kept passing through the central axis of the vertical frame edge, and the circle of a slide path of the third upward-traction guide pulley is tangent to the middle section of the slide path of the second upward-traction guide pulley; the fourth upward-traction guide pulley is mounted right below the third upward-traction guide pulley, a pulley direction of the fourth upward-traction guide pulley is orthogonal to a pulley direction of the third upward-traction guide pulley, and the circle of a slide path of the fourth upward-traction guide pulley is tangent to the middle section of the framework base; the fifth upward-traction guide pulley is mounted on a lateral side of the framework base at the same height and in the same plane as the fourth upward-traction guide pulley, and coincides with the middle section of the slide path of the fourth upward-traction guide pulley; and the sixth upward-traction guide pulley is mounted on the upper side of a beam where the fifth upward-traction guide pulley is located, and the middle section of a slide path of the sixth upward-traction guide pulley is tangent to the right side of the circle of a slide path of the fifth upward-traction guide pulley;

the double guide pulley is mounted on the lower rectangular frame right below the first upward-traction guide pulley; two coaxial pulleys of the double guide pulley can turn in opposite directions; and the double guide pulley is able to slide on an arc-shaped guide rail by taking the innermost ridge of the corresponding vertical frame edge as a rotation axis;

the first downward-traction guide pulley is mounted on a vertical frame edge and located inside the upper three-dimensional space of the static platform framework, and a symmetry plane of the pulley coincides with a diagonal plane of the vertical frame edge; the second downward-traction guide pulley is mounted at the inner side of the lower rectangular frame at the left with respect to the first downward-traction guide pulley, and the middle section of a slide path of the pulley is parallel to a plane where it is located; and the third downward-traction guide pulley is mounted at the inner side of a corresponding beam of the framework base right below the beam where the second downward-traction guide pulley is located; and the first rotation-traction guide pulley is mounted right below the first downward-traction guide pulley; the second rotation-traction guide pulley is mounted at the inner side of a corresponding beam of the lower rectangular frame below the second upward-traction guide pulley, and the middle section of a slide path of the pulley is parallel to its mounting surface; and the third rotation-traction guide pulley is mounted at the inner side of a corresponding beam of the framework base right below the beam where the second rotation-traction guide pulley is located.

4. The flexible-rope-driven hybrid spray painting robot mechanism according to claim 3, wherein the first upward-traction guide pulley comprises a pulley, a deep groove ball bearing, a shoulder screw, a retaining ring, a hexagon nut, a pulley bracket, a slider, an arc-shaped guide rail, a 90-degree arc-shaped guide rail baseplate, bracket screws, guide rail mounting screws, and guide rail baseplate mounting bolts;

the deep groove ball bearing has an interference fit with an inner hole of the pulley, and is located at the middle in a pulley thickness direction; the shoulder screw successively passes through one lateral plate of the pulley bracket, the retaining ring, the deep groove ball bearing, and the other lateral plate of the pulley bracket, and is finally fastened by the hexagon nut; a pulley bracket baseplate is fastened to the slider via bracket screws; the arc-shaped guide rail is connected to the arc-shaped guide rail baseplate via the guide rail mounting screws; and two ends of the arc-shaped guide rail baseplate are respectively connected to two adjoining beams of the upper rectangular frame, and a centerline of the corresponding vertical frame edge passes through the geometric circle center of the arc-shaped guide rail.

5. The flexible-rope-driven hybrid spray painting robot mechanism according to claim 3, wherein the drive mechanisms comprise four upward-traction drive mechanisms, four downward-traction drive mechanisms, and four rotation-traction drive mechanisms; rotation shafts of the upward-traction drive mechanisms are parallel to a pulley axis of the sixth upward-traction guide pulley, and are mounted on the framework base; rotation shafts of the downward-traction drive mechanisms are parallel to a pulley axis of the third downward-traction guide pulley, and are mounted on the framework base; and rotation shafts of the rotation-traction drive mechanisms are parallel to a pulley axis of the third rotation-traction guide pulley, and are mounted on the framework base.

6. The flexible-rope-driven hybrid spray painting robot mechanism according to claim 5, wherein the upward-traction drive mechanism comprises a servo motor, a speed reducer, a motor bracket, a coupler, a long-shaft ring flange, a ring flange, a flexible rope roller, a roller support side plate, a roller support baseplate, a flexible rope fastening pan head screw, and a bearing; and the servo motor is connected and mounted at one end of the speed reducer via a bolt, and the speed reducer is mounted on the motor bracket; the flexible rope roller is provided with grooves; the flexible rope fastening pan head screw is used to fasten one end of the flexible transmission rope to the roller; the ring flange is mounted at one side of the flexible rope roller, and the long-shaft ring flange is mounted at the other side thereof; the ring flange and the long-shaft ring flange are separately connected to the roller support side plate via the bearing, and the roller support side plate is connected and mounted onto the roller support baseplate via a bolt; the shaft of the long-shaft ring flange is coupled to an output shaft of the speed reducer via the coupler; and the motor bracket and the roller support baseplate are separately fastened onto the framework base via bolts.

7. The flexible-rope-driven hybrid spray painting robot mechanism according to claim 5, wherein the moving platform comprises a casing, moving platform pullet sets, a universal joint inner ring holder, an inner ring bearing, a universal joint outer ring, an outer ring bearing, an outer ring bearing pedestal, a spray gun, and lifting lugs; and the casing has a hollow cavity enclosed by five sides, wherein a large round hole is made in the middle of the bottom surface and small holes are made in the four corners respectively; and the moving platform pullet sets are respectively mounted at the four corners of the inner bottom surface of the casing; the lifting lugs are mounted at the eight corners of the casing respectively; the spray gun is mounted below the universal joint inner ring holder, and shafts of the spray gun at the two ends fit into inner holes at the two ends of the universal joint outer ring via the inner ring bearing; two end shafts of the universal joint outer ring fit into the outer ring bearing pedestal via the outer ring bearing; and the outer ring bearing pedestal is mounted at the bottom of the casing.

8. The flexible-rope-driven hybrid spray painting robot mechanism according to claim 7, wherein the flexible transmission ropes comprise upward-traction flexible ropes, downward-traction flexible ropes, and rotation-traction flexible ropes; and the upward-traction flexible ropes tilt up respectively from the lifting lugs at the upper four corners of the moving platform casing, change directions through the first upward-traction guide pulley to tilt down, come to the third upward-traction guide pulley through the second upward-traction guide pulley, then go downwards vertically along the vertical frame edges through the pulley, change by 90 degrees through the fourth upward-traction guide pulley to go along the outer side of the framework base, change directions through the fifth upward-traction guide pulley to go upwards vertically, and change directions through the sixth upward-traction guide pulley to tilt forward to the upward-traction drive mechanisms;

the downward-traction flexible ropes tilt down respectively from the lifting lugs at the lower four corners of the moving platform casing, pass through the downward-traction guide pulley of the double guide pulley and then go upwards along the vertical frame edges, change directions through the first downward-traction guide pulley to go downwards along the vertical frame edges, and slightly adjust directions through the second downward-traction guide pulley; and after passing through the third downward-traction guide pulley, the flexible ropes go along the beams where they are located to the downward-traction drive mechanisms; and the rotation-traction flexible ropes are wound around the moving platform pullet sets from the pull rings on the universal joint inner ring holder of the moving platform; tilt down and pass through the double guide pulley, the first rotation-traction guide pulley, the second rotation-traction guide pulley; and finally come to the rotation-traction drive mechanisms through the third rotation-traction guide pulley.

9. The flexible-rope-driven hybrid spray painting robot mechanism according to claim 1, wherein the workpiece conveying mechanism is a chain conveyor belt mechanism, and spans inside the static platform framework as a support platform for placement of a workpiece; and a conveyor belt mechanism main body is fixed to the lower rectangular frame via bolts.

10. A method for operating a flexible-rope-driven hybrid spray painting robot mechanism, comprising the following steps:

(1) placing, by a loading device, a workpiece on a workpiece conveying mechanism;
(2) conveying, by the workpiece conveying mechanism, the workpiece to a designated spraying work point, and stopping operation to realize fixing of the workpiece;
(3) controlling, by upward-traction drive flexible ropes and downward-traction drive flexible ropes in parallel, three degrees of freedom of translation of a moving platform; driving, by rotation-traction flexible ropes, an end spray gun connected in series to the moving platform, and controlling two degrees of freedom of rotation of the end spray gun with respect to the moving platform to realize movement of the spray gun for a spraying operation;
(4) starting the conveying mechanism after the end spray gun completes the spraying operation, to convey the processed workpiece out of a spraying area; and
(5) transporting, by a transport device, the processed workpiece to an area for a next process.

* * * * *